United States Patent
Rowe (10) Patent No.: US 8,943,528 B1
(45) Date of Patent: Jan. 27, 2015

(54) PROBABILISTIC MATCHING OF TELEVISION PROGRAM AUDIO SIGNALS

(71) Applicant: Google Inc., Mountain View, CA (US)

(72) Inventor: Simon Michael Rowe, Berkshire (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/780,258

(22) Filed: Feb. 28, 2013

Related U.S. Application Data (60) Provisional application No. 61/692,083, filed on Aug. 22, 2012.

(51) Int. Cl.
  *H04H 60/32* (2008.01)
  *H04N 17/00* (2006.01)
(52) U.S. Cl.
  CPC ..................................... *H04N 17/00* (2013.01)
  USPC .......................................................... 725/18
(58) Field of Classification Search
  USPC .......................................................... 725/18
  See application file for complete search history.

(56) References Cited

PUBLICATIONS

Isard et al., "Visual Motion Analysis by Probabilistic Propagation of Conditional Density", Sep. 1998.

*Primary Examiner* — Pankaj Kumar
*Assistant Examiner* — Charles N Hicks
(74) *Attorney, Agent, or Firm* — Foley and Lardner LLP; John D. Lanza (57) ABSTRACT

A system for probabilistic matching of audio sample from a television program includes a computer readable storage medium having encoded thereon an audio matching program; and a processor that executes the audio matching program. The processor receives reference audio for time slices corresponding to a broadcast television program for each of a plurality of channels broadcasting television programming; receives a first audio sample from a media device on which is displayed the broadcast television program; selects one or more candidate channels to test to determine a channel to which the media device is tuned; compares the first audio sample to the selected candidate channels to determine a match between the first audio sample and one or more of the selected candidate channels; and when the first audio sample matches a reference audio from a selected candidate channel, identifying, with a specified probability, the selected candidate channel as the tuned to channel.

16 Claims, 5 Drawing Sheets

PROBABILISTIC MATCHING OF TELEVISION PROGRAM AUDIO SIGNALS

BACKGROUND

Television programs, broadcast and streaming, and live and time-shifted, may emit audio signal that may be analyzed to identify the programs. For example, an audio meter connected to a television may record snippets of audio from a television program. The audio snippets may be processed and compared to an audio database. The audio database contains audio references derived from the same programs. A match that occurs between the processed audio snippets and the audio references then may be used to identify the television program or the channel on which the television program was played. However, the audio database may contain many millions of audio references. Television programs may be broadcast over hundreds of channels, 24 hours a day, 7 days a week. This mass of data has historically required extensive computing resources to identify a particular program or channel. This situation is made worse when time shifted television and streaming television are considered.

SUMMARY

A system for probabilistic matching of audio sample from a television program includes a computer readable storage medium having encoded thereon an audio matching program; and a processor that executes the audio matching program. The processor receives reference audio for time slices corresponding to a broadcast television program for each of a plurality of channels broadcasting television programming; receives a first audio sample from a media device on which is displayed the broadcast television program; selects one or more candidate channels to test to determine a channel to which the media device is tuned; compares the first audio sample to the selected candidate channels to determine a match between the first audio sample and one or more of the selected candidate channels; and when the first audio sample matches a reference audio from a selected candidate channel, identifying, with a specified probability, the selected candidate channel as the tuned to channel.

A system for identifying a tuned-to television channel includes means of storing an audio matching program and means for executing the audio matching program. The audio matching program includes means for receiving reference audio for time slices corresponding to a television program for each of a plurality of channels carrying television programming, means for receiving a first audio sample from a media device on which is displayed the television program, means for selecting one or more candidate channels to test to determine a channel to which the media device is tuned, means for comparing the first audio sample to the selected candidate channels to determine a match between the first audio sample and one or more of the selected candidate channels, and when the first audio sample matches a reference audio from a selected candidate channel, means for identifying, with a specified probability, the selected candidate channel as the tuned-to channel.

A method for determining a television channel to which a media device is tuned, includes receiving by a processor an audio sample from each of a plurality of television channels in a first time slice; and comparing by the processor the audio sample of each of the plurality of television channels to a reference audio, including selecting by the processor a television channel for the comparing based on a probability of the television channel being the tuned-to television channel, and when the audio sample from the selected television channel matches the reference audio with a determined confidence level, identifying the selected television channel as the tuned-to television channel.

DESCRIPTION OF THE DRAWINGS

The Detailed Description refers to the following figures in which like numerals refer to like items, and in which.

DETAILED DESCRIPTION

Companies may spend many millions of dollars per year on television content to build brands, engage and educate consumers and market their products. Success in using this television content may be measured in terms of brand recall, number of new customers, sales and actions depending on the type of products and services being marketed. Increasing the return on investment on television content and its impact is important to television content providers.

One way to increase return on investment is to more closely match television content served to individual television viewers or groups of television viewers. Television content matching may involve some form of monitoring in which programs watched information is noted and reported to a central server. One way of identifying programs watched involves recording audio signals associated with the television content and then matching the recorded audio signals to a reference library of audio signals known to be associated with specific television content.

One way to match audio signals to a reference library is to use an audio matching system that includes an audio-based television meter coupled to a central server. The audio-based television meter is deployed at a television viewing location to periodically capture samples of audio and send the audio samples to the central server. To establish an audio reference library, the central server records audio from existing, or live television programs. For example, the central server may record a few seconds of audio every 30 seconds from every broadcast television channel. The thus recorded audio is processed to form a reference audio, which then is stored with the central server. A stored reference may include the time, date, and channel of the associated television content. Thus, each broadcast television channel may have associated with it a reference audio for each time slice of each day, and for each day of a week, where each time slice is 30 seconds.

Rather than a single central server, a probabilistic audio matching system may employ a number of regionalized central servers. This architecture has the advantage of limiting the need to record live television programming to just what is broadcast or streamed regionally. For example, a regionalized central server may be established for southern California and another for metropolitan New York.

To be effective, the central server must be able to quickly and accurately match the audio samples and the reference audio. As the number of television channels to be matched increases, the associated "match space" increases linearly. If time-shifted television is taken into account as well, the number of potential matches for any audio sample increases significantly, as does the computational overhead necessary to process the potential matches. Some current audio matching systems and methods use an inefficient brute force method in which reference audio from every television channel is compared to the audio samples to find a match. For example, current systems may assume a uniform probability distribution among the candidate channels from which audio references are obtained, and thus, the current systems must process each channel's reference audio against the audio sample without regard to the possibility that a particular television is likely to be tuned to only a select number of channels. Thus, current systems engage in unnecessary oversampling and analysis.

To overcome these and similar limitations, disclosed herein are enhanced audio matching systems, and associated methods, that use probabilistic processing to quickly and accurately identify candidate matches between audio samples and reference audio. A television audio meter provides a stream of audio samples typically at 30 second intervals. These samples are matched to a library of reference audio. The reference audio is captured from live television, including television programming (i.e., shows) and related content segments (e.g., commercials). In addition to matching of audio from live television programming, the methods may be applied to time-shifted television viewing. As such, it may be that any particular audio sample needs to be matched to all the audio broadcast on 100 or more channels in the last seven days. For live television viewing, the audio matching may consider only audio broadcast on the 100 channels in the last 30 seconds. However, the matching process may be unconstrained in the sense that there may be multiple matches for any 30 second time slice. For example, the same commercial may air on multiple channels, or may air multiple times in a week (a consideration for time-shifted viewing). Thus, the systems and methods disclosed herein also consider the sequence of potential matches over time and look for coherent sequences of matches, taking the "longest" of these sequences (i.e. watching channel 5 continuously for 10 minutes) as "truth". This sequence processing may be completed as post-processing step after the matching process.

In an embodiment, the systems and methods combine the matching and sequencing processes. A central server establishes a series of 30 second time slices. The central server obtains reference audio for each television channels for each time slice. Simultaneously, audio meters integrated into, or connected to televisions or other media devices capable of showing television programs record audio samples for the same time slices. The audio meters supply the audio samples to the central server. The audio samples may be compressed or otherwise processed by the audio meters. The central server provides a filter which, at each time slice, has multiple hypotheses, each one of which has an associated probability, and each of which corresponds to watching a particular channel at a particular time. That is, a hypothesis equates to a television channel at a particular time. To move from a current time slice to the next time slice, the central server randomly chooses one channel, taking into account the relative probabilities that the channels are being watched, and applies a stochastic model to the current channel to get a candidate channel for the next time slice. This process is repeated, perhaps hundreds of times. These candidate channels (i.e., the reference audios) then are evaluated against the next time slice's audio samples to see how well those audio samples match the corresponding reference audios, and a probability is assigned based on the quality of the match and the likelihood of its seed hypothesis. After this has been done for all channels, the least likely channels are "pruned" and the remaining channels become the seeds for the next time slice. The current channel/time is assigned based on the highest probability at the current time slice.

The central server may apply one of at least two models. A first model would apply to live television viewing, and may assume the media device or television most likely will remain on the current channel, with some probability of moving to a channel one up or down, and a lower probability of leaping to any other channel or starting time shifted viewing. A second model would apply to time shifted viewing, and may assume the highest probability is that the media device or television would remain in a linear viewing mode with some probability of leaping forwards 30 seconds (or more) or stopping time shifted viewing and switching to live television viewing. In addition, the central server may process data "live" as the data from the audio meter arrives, or else may execute a post-process after a set of candidate matches have been found for each datum from the meter.

Figure 1:
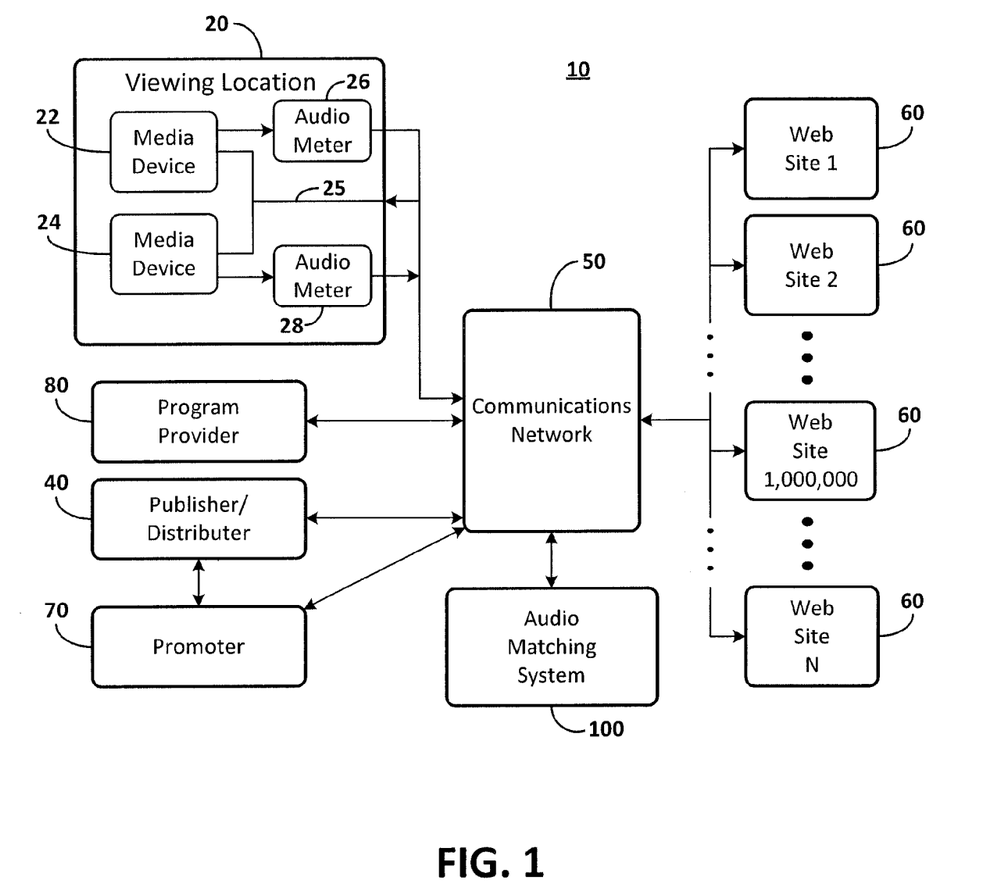
FIG. 1 illustrates an example environment in which probabilistic audio matching of television programming is enabled.

FIG. 1 illustrates an embodiment of an environment that enables probabilistic audio matching of television programming. In FIG. 1, environment 10 includes viewing location 20 that includes media devices that communicate by way of network 50 with publisher 40 and Web sites 60. The environment 10 also includes promoters 70, program providers 80 and audio matching system 100.

At the viewing location 20, individuals may view television programs and television content on a television program display device (i.e., media devices 22 and 24) and may communicate with the Web sites 60 using the media devices 22 and 24. In an embodiment, media device 22 generally is fixed in position in the environment 10, and media device 24 is a mobile media device. The media devices 22 and 24 may be capable of two-way communication using the communications network 50 and communications path 25. The communications path 25 may be wired or wireless, or both wired and wireless. In an embodiment, the media device 22 may be an Internet connected "smart" television, a "basic" or "smart" television connected to a set top box (STB), a Blu-ray™ player, a game box, and an Internet-connected box, for example. In another embodiment, the media device 22 may be a television that has no Internet connectivity. A television that includes Internet connections is referred to hereafter as an ITV. In this same embodiment, the media device 24 may be a tablet, a smart phone, a laptop computer, or a desk top computer, for example.

When the media devices 22 and 24 are turned on, an individual using the media devices 22 and 24 may sign on with a service or program provider such as a television program provider to access broadcast television programs or an Internet service provider to access streaming television programs. In some cases, the media devices may sign on automatically using previously provided and stored credentials or other authentication information. The media devices 22 and 24 may receive specific content segments with the television programs once the individual has consented to receiving such specific content segments. The individual may signal this consent upon initial contact with the service or program provider, or may consent to such participation at each sign on. As an incentive for such participation, the service or program provider may charge the individual reduced fees. However, even when the individual has initially consented to participation in the above-described content segment serving process, the individual at any time may opt out of such participation.

Associated with each of the media devices 22 and 24 may be audio-based television meters 26 and 28, respectively. With the consent of the individual, the audio meters 26 and 28 may periodically record audio signals emanating from their respective media devices 22 and 24. The media devices 22 and 24 also may send other data, such as the location, based, for example on IP address (IP ADD), of the media devices and/or the GPS location, to the content display system 100. This information may be provided by the individual voluntarily. For example, an individual may register with the publisher/distributer 40 or otherwise agree to serve as a panelist and may provide information such as a password and user ID. In situations in which the systems disclosed herein collect personal information about the individuals, or may make use of personal information, the individuals may be provided with an opportunity to control whether programs or features collect individual information (e.g., information about an individual's social network, social actions or activities, profession, an individual's preferences, or an individual's current location), or to control whether and/or how to receive sponsored content segments that may be more relevant or of interest to the individual. In addition, certain data may be treated in one or more ways before it is stored or used, so that personally identifiable information is removed. For example, an individual's identity may be treated so that no personally identifiable information can be determined for the individual, or an individual's geographic location may be generalized where location information is obtained (such as to a city, ZIP code, or state level), so that a particular location of an individual cannot be determined. Thus, the individual may have control over how information is collected about the individual and used by a server.

The publisher 40 provides television programming for transmission over the communications network 50 for display on one or more of the media devices 22 and 24. The television programming may be event driven, such as a sporting event, or may be a more constrained program, such as a dramatic show. The television programming may be structured to include one or more program breaks in which related television content, such as commercials, are aired. The publisher 40 may operate one or more programming networks (not shown in FIG. 1) over which the television programming is broadcast or streamed.

The network 50 may be any communications network that allows the transmission of signals, media, messages, voice, and data from the publisher 40 and the Web sites 60 to the viewing location 20, including linear broadcast (over-the-air, cable, and satellite) television, on-demand channels, over-the-top media, including streaming video, movies, video clips, and games, and text, email, and still images, and transmission of signals, media, messages, voice, and data from the viewing location 20 to the content display system 100. The network 50 may include the Internet, cellular systems, and other current and future mechanisms for transmission of these and other media. The network 50 may be both wired and wireless.

The Web sites 60 provide Internet-based content, including streaming television programs for display at the media devices 22 and 24. The Web site 60 may interface with the publisher 40 and promoter 70 to display, online, television programs and content segments. As can be seen in FIG. 1, there may be millions of Web sites 60 that provide online television programs.

The promoter 70 generates content that may be displayed in conjunction with the display of the television programming (i.e., during the program breaks). The promoter 70 also generates, or facilitates generation of content segments that appear on the Web sites 60.

The program provider 80 generates and provides television programming that is broadcast by the publisher 40.

Figure 2:
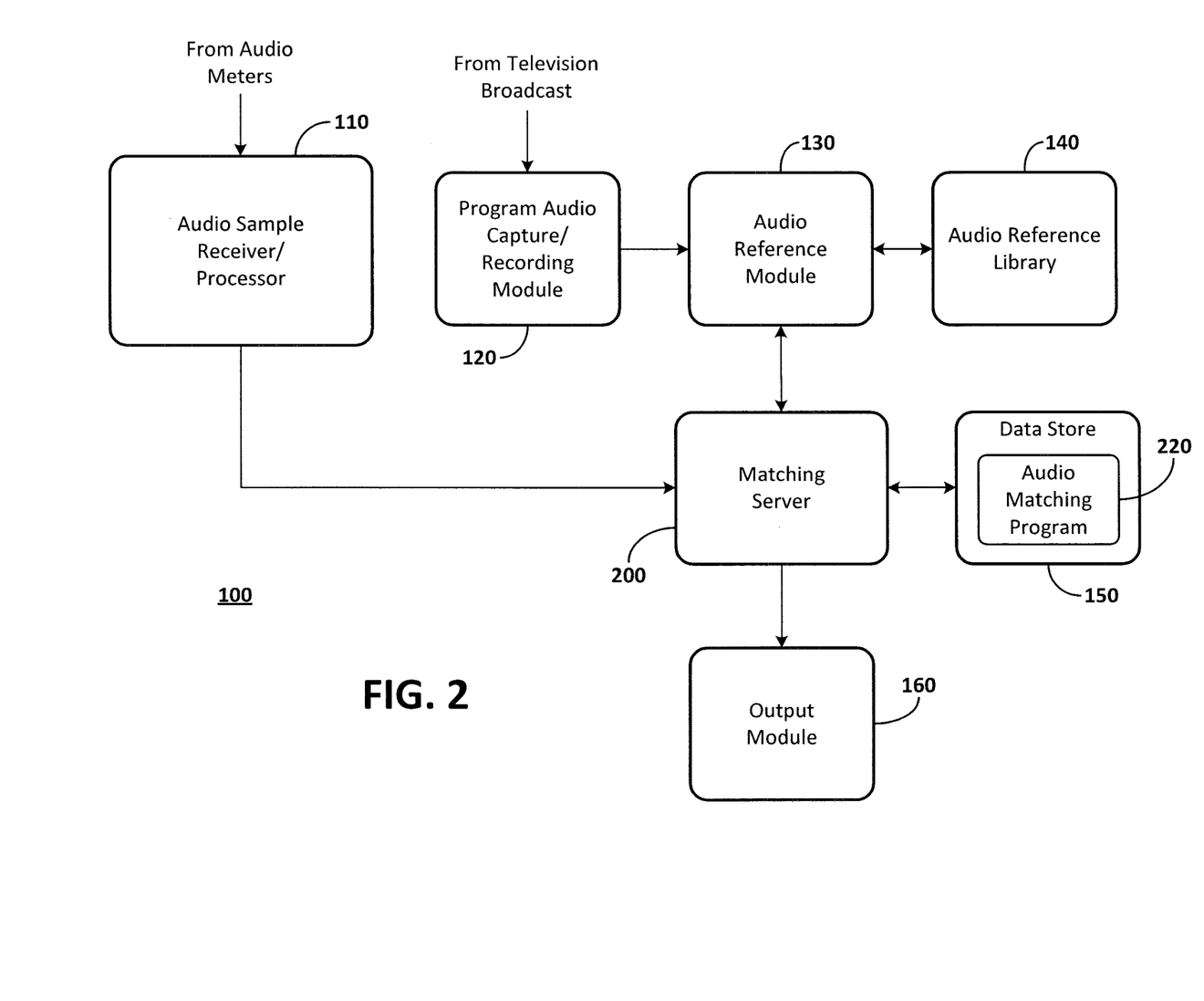
FIG. 2 illustrates an example probabilistic audio matching system.
Figure 3:
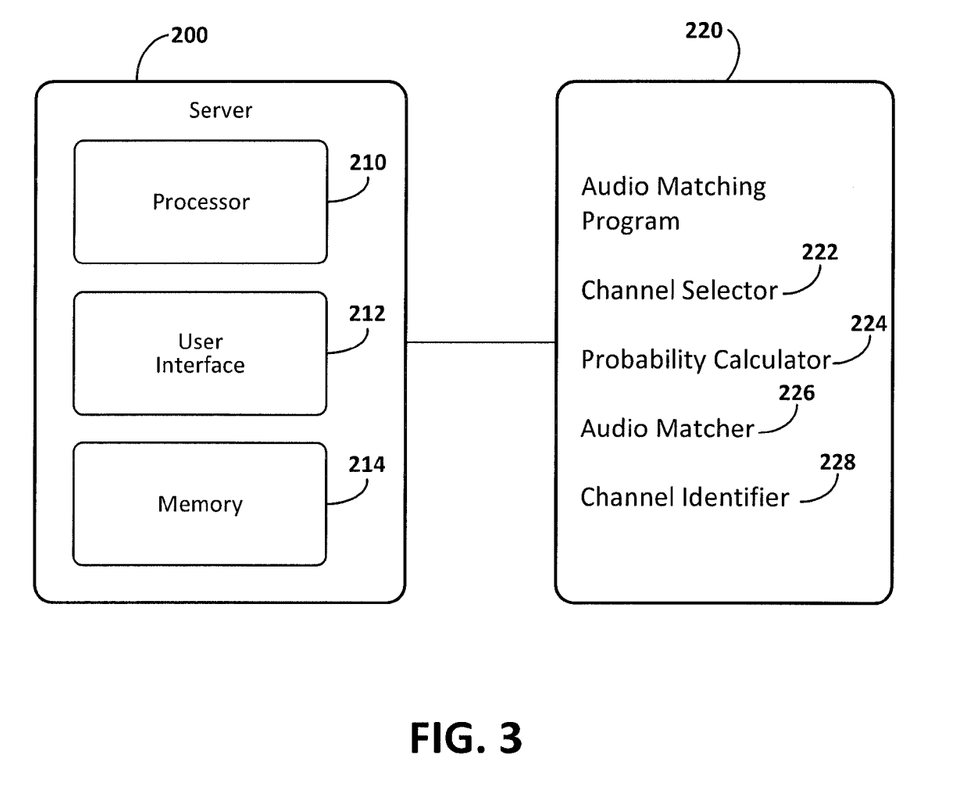
FIG. 3 illustrates example components of the audio matching system of FIG. 2.

The audio matching system 100 is shown in more detail in FIGS. 2 and 3.

One way to improve the relevancy of content segments served on the media devices 22 and 24 is to serve content segments based on observable data from the television programming including audio signals. One such way to tie the content to the observable data is to capture and analyze the observable data, and then to base the promotional decision on the analysis. One way to capture the observable data involves a technique known as automatic content recognition. Thus, the system 100 may identify television programs and content segments displayed on the media devices 22 and 24 based on recordings of audio samples from the programs and content segments. In this regard, an audio sample may be a short duration audio segment, perhaps 5 or 6 seconds in length. Such audio samples may be recorded every 30 seconds (e.g., seconds 0-5, 30-35, 60-65, etc.). In this system 100, the audio-based television meters 26 and 28 record the audio samples. The meters 26 and 28, or another related component, then send the audio samples to central server 200 (see FIG. 2), which is remote from the viewing location 20, where audio matching occurs.

To accomplish the audio identification, the audio samples may be processed in a pattern recognition system (e.g., the system 100), which compares features of the audio samples with similar feature data stored in a reference audio library. The system 100 creates reference audio by continuous extraction of feature waveforms from a collected audio stream. The feature waveforms then are broken into overlapping time-series segments and processed to determine which features should be used for signal recognition and in what order. The resulting reference pattern data structures (sometimes referred to as fingerprints) are stored for subsequent match processing. Matching algorithms can identify programs and content in real time or near real time based on the signatures.

FIG. 2 illustrates an example of a probabilistic audio matching system. In FIG. 2, system 100 can be seen to include audio sample receiver/processor 110, television program audio capture/recording module 120, audio reference module 130, reference audio library 140, data store 150, and output module 160, all of which are coupled directly or indirectly to matching server 200. The audio sample receiver/processor 110 receives audio samples (e.g., every 30 seconds) from the audio meters 26 and 28. The processor 110 may perform pre-match analysis processing including decompressing the audio samples.

The program audio capture/recording module 120 records audio segments of television programming broadcast over all television channels in a given region. The recording process of the module 120 may be synchronized with that of the audio meters 26 and 28. For example, the audio samples may include a date and time stamp, as may the audio segments captured by the module 120. The module 120 may broadcast a reference signal to the audio meters 26 and 28 to ensure the date/time stamps match.

The audio reference module 130 processes the audio segments captured by the module 120 to produce reference audio. The module 130 stores the reference audio in reference audio library 140. The module 130 makes the reference audio available to the matching server 200 on a real time or near real time basis for matching audio associated with live television program viewing. The module 130 makes stored reference audio available to the matching server 200 for matching audio associated with time shifted television program viewing.

The audio reference library 140 stores reference audio for matching with audio samples. The reference audio may be stored for a week or more and then discarded.

The data store 150 is, or includes, a non-transitory computer readable storage medium on which may be stored program code (audio matching program 220) for executing the matching processes of the matching server 200. The matching program 220 and the matching server 200 are described in more detail with respect to FIG. 3.

The output module 160 may produce a report of channels viewed and programs watched. The report may be provided to any one of the entities shown in FIG. 1.

FIG. 3 illustrates components of the system 100, specifically the matching server 200 and the audio matching program 220, in more detail. In FIG. 3, matching server 200 includes processor 210, which executes the machine code of the audio matching program 220. The sever 200 also includes user interface 212 by which a system administrator, as well as other machines, may interface with the server 200. Finally, the server 200 includes memory 214, in which elements of the program 220 may be loaded for execution, and in which the audio samples and reference audio may be loaded for matching analysis.

The program 220 includes channel selector module 222, probability calculator 224, audio matcher 226, and channel identifier 228. These modules of the program 220 provide for probabilistic determination of channel identity based on comparison of audio samples and reference audio.

The channel selector module 222 selects a subset of channels that may be used at least in an initial match process to test reference audio against audio samples collected by each of a number of audio meters. The module 222 selects the subset of channels using, in one example, on a Bayesian probability in which a posterior probability is based on an existing channel to which a media device is tuned. For example, the probability that a media device will be tuned to a specific channel in a future time slice may be higher if the media device is tuned to the same channel in a current time slice. Alternately, the module 222 may use a stochastic process such as a Markov model to select channels.

The probability calculator 224 computes the posterior probabilities for each channel based on the current channel to which the media device is tuned, the number of consecutive time slices during which the media device is tuned to the same channel (e.g., a coherent sequence of time slices), channel tuning history for the media device (day, time of day), channel history for a group of media devices (e.g., for similarly placed media devices), and other factors.

The audio matcher 226 performs audio matching pattern comparisons to determine a closest match (or multiple close matches) between the audio sample in a given time slice and reference audios from one or more of the channels over which television programs are broadcast.

The channel identifier 228 uses the results of the audio matching of audio matcher 226 to select a channel having the highest probability of being the correct channel (i.e., the channel to which the media device actually is tuned).

The program 220 operates, for example, under the following assumptions.

The media device 22 may be used to display live television programming or time shifted television programming (leaving out recordings, such as DVDs). When live programming is being viewed, the media device 22 may remain tuned to the same channel with a first probability, may be tuned up or down one channel with a second probability, may be tuned to a non-adjacent channel with a third probability, and may be changed to time-shifted television programming with a fourth probability. When the media device 22 is displaying time shifted television programming, the media device 22 may, with a first probability, display the programming linearly, may, with a second probability, be moved forward by some time-shifted period, or may, with a third probability, be changed back to live television program viewing. Other tuning options for live and time-shifted television program viewing may be possible.

The program 220 is executed by the matching server 200. The program 220 is executed in steps. A first step or process involves current time-slice matching between a collected audio sample from the audio meter and a reference audio from the same time slice. This matching process may identify one or more possible matches (i.e., one or more channels to which the media device 22 may be tuned). The reasons why more than one channel may be identified include that more than one channel may be displaying the same television programming, and that the comparison may not show a conclusive match (e.g., greater than a specified confidence level) due to noise in the audio sample and other sampling and processing ambiguities.

Figure 4:
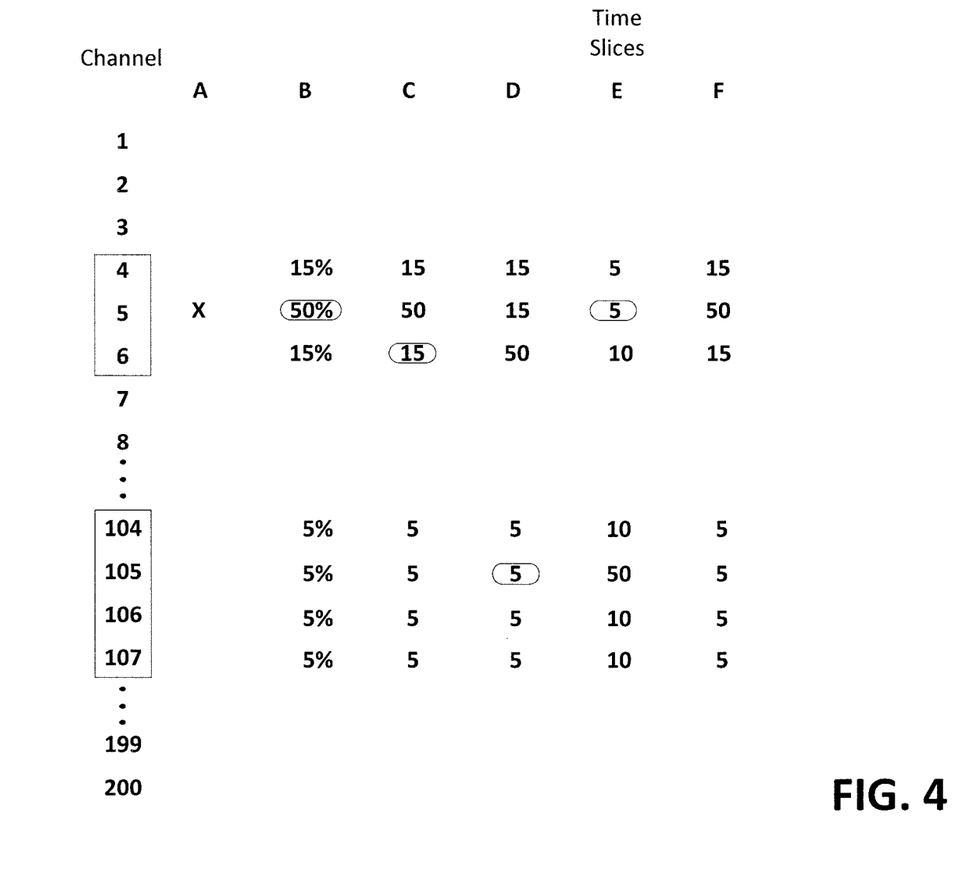
FIG. 4 illustrates an example television channel lineup.

FIG. 4 shows a channel mapping versus time. Assume there are 200 available channels (channels 1-200). For ease of explanation, only a portion of those channels are shown. FIG. 4 shows time slices A-F, each of which is 30 seconds. During time slice A, media device 22 is tuned to channel 5, and the matching server 200, from prior time slice analysis, has identified channel 5 as the tuned-to channel. Audio meter 26 operates to record six seconds of audio from the media device 22 every 30 seconds. The audio meter 26 compresses the recorded audio signal and sends the compressed audio signal to the audio matching server 200.

The matching server 200 operates according to the probabilities shown between the channels. Thus, after time slice A, the matching server 200 first will compare the compressed audio signal (i.e., the audio signal for time slice A) to a reference audio for channel 5, because the probability of the media device 22 being tuned to channel 5 in time slice B, given that the media device 22 was tuned to channel 5 in time slice A, is 50 percent. If no match is detected, the matching server 200 will compare the time slice A compressed audio signal to that from channels 4 and 6, since channels 4 and 6 each show a 15 percent probability of tuner selection in time slice B. If the matching server 200 cannot match the time slice B audio signal to a reference audio for channels 5 or 6, the matching server next selects channels 104-107. This process continues until a match is found. However, the above described matching process may be performed in any order among the channels, or may be performed simultaneously among the channels, as long as all channels are tested.

To declare a match found, the matching server 200 may need to achieve a 95 percent confidence level between the compressed audio signal and a fingerprint.

As can be seen in the example of FIG. 4, the media device 22 is tuned from channel 5 in time slice B, to channel 6 in time slice C, to channel 105 in time slice D, to channel 5 in time slice E, and so on.

Note that the matching server 200 may identify multiple channels in any given time slice as a match. For example, in time slice B, the matching server may show channels 5 and 105 as matches. One explanation for this result is that exactly the same content segment was played at exactly the same time over both channels 5 and 105. In time slices C and D, the matching server 200 shows the media device continues to be tuned to either channel 5 or 105. However, at some time subsequent, say in time slice E, the matching server 200 may show the media device 22 is tuned to channels 5 and 107. One conclusion that the matching server 200 might reach from these data is that the media device 22 has been tuned to channel 105 during the entire duration of time slices B-F. As this process continues, the longer this coherent matching goes on, the higher the confidence level is that the identified channel is the channel to which the media device 22 actually is tuned. This confidence level associated with the identified channel then may be used to adjust the probability of the hypotheses for the next time slice. For example, if the matching server 200 identifies channel 5 as the channel to which the media device 22 actually is tuned, with a 99 percent confidence level, the probability that in the next time slice the media device 22 is tuned to channel 5 may be increased from 50 percent to 60 percent. Thus, the predicted probabilities may change, up or down, for a given channel based on the post-matching coherency processing.

Thus, given a current channel of the media device 22, the matching server 200 predicts for a subsequent time slice, the channel of the media device 22. Since this matching process may produce more than one channel for subsequent time slices, the matching server 200, after the matching step, may resolve the matches to identify sequential matches.

In a further refinement, the matching server 200 assigns probabilities to channels in future (i.e., the next) time slices. The assignment of probabilities may be based on a number of factors. One such factor is how well (in terms of confidence level, for example) the sample and reference signals match. Another factor may be the learned behavior of the individual. For example, a viewing history associated with media device 22 may show that channel 5 is selected in 50 percent of all time slices, while channel 105 is selected in 15 percent of all time slices. Further, the viewing history of media device 22 may show that when the media device 22 is tuned to channel 5, the probability of changing to channel 6 is 15 percent. For live television programming, the probabilities also may consider time and date information.

The matching server 200 may identify a number of candidate channels for each time slice. The matching server 200 may identify one or more of these candidate channels as a match. The channels that have the lowest probability may be "pruned" from a list of possible channel candidates so that for the next time slice, the processing load is reduced.

Once the pruning process is completed, the matching server 200 may compare audio samples for the next time slice to the subset (i.e., non-pruned) of remaining channel audio references. The matching process for this next time slice may consider all channels in the subset simultaneously, in order from highest probability to lowest probability, or in any other order, so long as all channels in the subset are considered.

In some time slices, no match may be identified, or an audio signal and reference signal may show a low quality match, for example, a 60 percent confidence level. The matching server 200 may use a baseline channel lineup for each media device. For example, with the channel lineup shown in FIG. 4, channels 4-6 and 104-107 may constitute a baseline channel lineup for media device 22.

Note that in FIG. 4, some channels are assigned a zero probability. However, in reality, each of the channels 1-200 would have some probability, however small, that the media device 22 would be tuned to that channel. However, for ease of discussion, only a limited number of channels are shown with probabilities assigned. In addition, a subset of the channels 1-200 may be excluded from the audio matching process. For example, some channels may never, or may seldom provide any audio. Other channels may not broadcast television programs. Some channels may play music, with no audio. For other reasons, some channels may be excluded from the audio matching process.

Time shifted television viewing adds complications. For example, a viewer could shift between live programming and time shifted programming. The audio meter may be able to detect such shifts. Furthermore, with time shifted television, the viewer may shift back and forth in time. To account for time shifted viewing, the matching server 200 may preserve reference signals for a period, such as the last seven day, for example. (Note that for live programming, the matching server 200 only has to retain audio reference signals for the last time slice. In practice, the matching server 200 may maintain reference signals for use with live programming for several time slices.)

The matching and post-matching (coherency) processes may be applied in real time or near real time as audio samples from the audio meter arrive at the matching server. Alternately, matching and coherency processes may be executed after a time delay.

The matching server 200 may invoke different models between live television program viewing and time-shifted television program viewing. For example, with live television program viewing, the matching server 200 may begin with a basic assumption that the highest probability is that media device 22 will remain tuned to the current channel, will be tuned to an adjacent channels (i.e., up or down one channel) with the next highest probability, and tuned to a non-adjacent channel with a still lower probability. For time shifted television program viewing, the matching server 200 may begin with the assumption that the highest probability is that the media device 22 will continue to display time shifted programming linearly and a lower probability of leaping forward or stopping time shifted television program viewing and moving to live television program viewing.

The above-described matching process of the program 200 began with the assumption that the matching server 200 had the identity of the channel to which the media device 22 was initially tuned. However, the matching server 200 may not necessarily have this information available; that is, the currently tuned channel may not have been identified. In this situation, the matching server 200 may follow another processing option, initially. In one example, the matching server 200 may execute a brute force process in which each channel is assigned an equal probability, and all channels are tested to identify the tuned to channel. This brute force process may proceed for more than one iteration of the process. In another example, the matching server 200 may use past viewing histories to narrow the list of candidate channels, or at least to assign certain channels a higher probability than others. For example, the matching server 200 may have established a baseline channel lineup of channels 4-6 and 104-107 for media device 22, and consequently, these channels begin with a higher tuning probability.

In another example, the matching server 200 uses use the viewership profile of all the channels, which is determined from audio samples supplied by other audio meters, to determine a prior probability as to what channel the media device 22 is tuned to. For example, if 50 percent of monitored media devices are observed tuned to a Monday night football, there is a good chance the media device 22 also will be tuned to the Monday football game.

Figure 5:
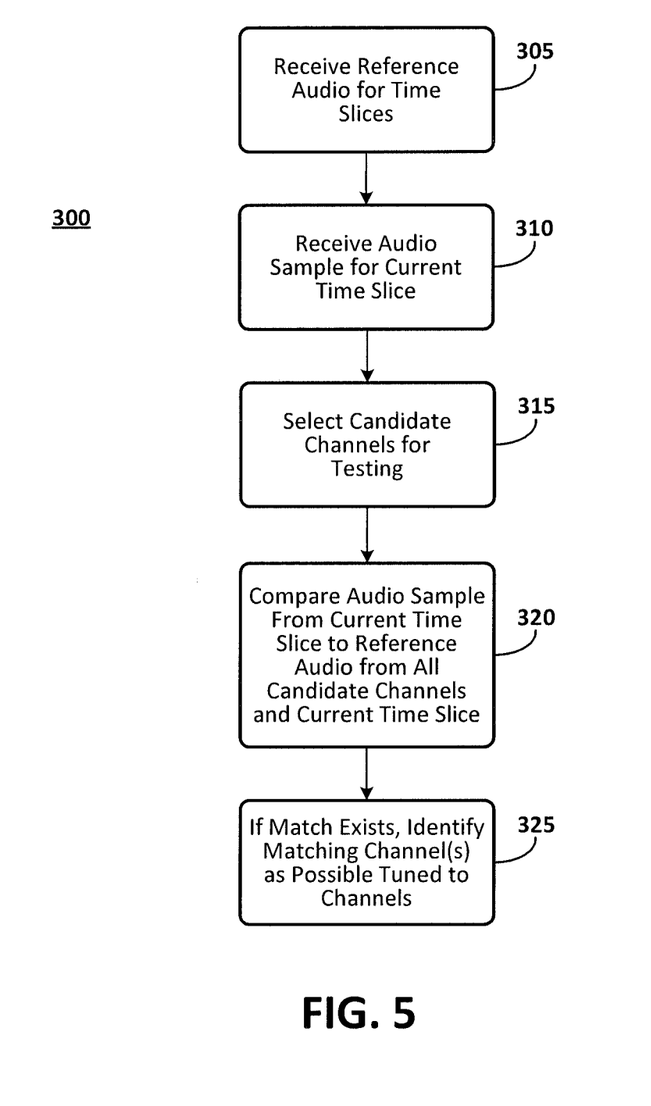
FIG. 5 is a flowchart illustrating an example probabilistic audio matching process.

FIG. 5 is a flowchart illustrating an example probabilistic audio matching process. In the example process, the matching server 200 receives audio samples from each of a number of audio meters connected to, or integrated into, media devices such as the media devices 22 and 24 of FIG. 1. However, for ease of description, the process is described with respect to audio samples received from a single audio meter. Furthermore, the example process is described with the matching server 200 having determined, within a specified confidence interval, the channel to which the media device 22 is tuned. For example, and referring to FIG. 4, the matching server 200 has determined that the media device 22 is tuned to channel 5.

In FIG. 5, process 300 begins in block 305 when the matching server 200 receives reference audio for time slices corresponding to a broadcast television program for each of an existing number of channels broadcasting television programming. In block 310, the matching server 200 receives an audio sample from audio meter 26, which collects audio from the television programs being displayed on media device 22. The received audio sample is for a current time slice, such as time slice B of FIG. 4.

In block 315, the matching server 200 selects one or more candidate channels to test to determine a channel to which the media device 22 is tuned (in time slice B). In the example of FIG. 4, the candidate channels might include channels 4-6 and 104-107. Note that the probabilities shown in time slice B may be "learned" by the matching server 200.

In block 320, the matching server 200 compares the audio sample from time slice B to the selected candidate channels to determine if a match exists between the audio sample and one or more of the reference audios from the selected candidate channels.

In block 325, if a match exists (i.e., the audio sample matches a reference audio from a selected candidate channel), the matching server 200 identifies, with a specified probability, the selected candidate channel as the tuned-to channel to which the media device 22 is tuned. Following block 325, the process 300 ends.

However, the matching server 200 continues to match audio samples to reference audios, and in so doing may develop a sequence of identified channels. A sequence of such identified channels (e.g., the matching server 200 identifies channel 5 as the tuned to channel for 100 consecutive time slices (50 minutes)), which may lead to a greater confidence in the channel (5) as the actual channel to which the media device 22 is tuned. The matching server 200 may factor this increased confidence (e.g., moving from a 95 percent confidence level to a 99 percent confidence level) in the calculation of a future probability that the media device 22 will remain tuned to the channel (referring to FIG. 4, the probability for channel 5 might be increased from 50 percent to 60 percent (and other channels would experience a decreased probability)).

The system 100 and the associated process 300 are disclosed primarily with specific application to broadcast television programming (over-the-air, by cable, and by satellite). However, the system 100 and process 300 also may be applied to streaming television, including television programs distributed over the Internet, video programs such as those supplied by individual viewers, and other video programming. In addition, the system 100 and process 300 may be applied to radio broadcasts.

Certain of the devices and components shown in FIGS. 1-3 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flow chart and accompanying description to illustrate the embodiments represented in FIG. 5. The disclosed devices, components, and systems contemplate using or implementing any suitable technique for performing the steps illustrated. Thus, FIG. 5 is for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

I claim:

1. A system for probabilistic matching of audio samples from a television program, comprising:
   a processor, configured to:
   receive reference audio for time slices corresponding to a television program for each of a plurality of channels carrying television programming,
   receive a first audio sample from a media device on which is displayed the television program,
   select one or more candidate channels from the plurality of channels to test to determine a channel to which the media device is tuned by determining, based on the identity of a previously tuned-to channel, tuning probabilities for each of the plurality of channels, and discarding channels having a tuning probability below a threshold value;
   compare the first audio sample to the selected candidate channels to determine a match between the first audio sample and one or more of the selected candidate channels, and
   when the first audio sample matches a reference audio from a selected candidate channel, identify, with a specified probability, the selected candidate channel as the tuned-to channel.

2. The system of claim 1, wherein the processor is further configured to assign a sequence of consecutively-matched channels an increased probability of being the tuned-to channel.

3. The system of claim 1, wherein when the processor selects one or more candidate channels to test to determine a channel to which the media device is tuned, the processor is further configured to:
   select as a first channel to test, a channel having a highest probability of being the tuned-to channel; and
   when testing the channel having the highest probability of being the tuned-to channel does not produce a match between the first audio sample and the reference audio, select as a second channel to test, a channel having a next highest probability of being the tuned-to channel.

4. The system of claim 3, wherein the processor is further configured to determine a probability of being the tuned-to channel for each of the plurality of channels.

5. The system of claim 4, wherein the processor is further configured to assign probabilities to each of the plurality of channels in future time slices.

6. The system of claim 1, wherein the processor is further configured to determine a confidence level of a match between an audio sample and a reference audio for each channels of the plurality of channels.

7. The system of claim 6, the processor is further configured to learn a channel tuning behavior of an operator of the media device.

8. The system of claim 1, wherein the processor is further configured to exclude one or more channels from the plurality of channels for executing the audio matching program.

9. The system of claim 1, wherein the television program is a broadcast television program.

10. The system of claim 1, wherein the television program is a streaming television program.

11. The system of claim 1, wherein the television program is a time-shifted television program.

12. The system of claim 1, wherein determining tuning probabilities for each of the plurality of channels further comprises assigning a first probability to a first candidate channel selected based on the channel distance between the first candidate channel and a previously identified tuned-to channel; and increasing the first probability responsive to a viewing history of the media device including the first candidate channel.

13. A method for probabilistic matching of audio signals, comprising:
   receiving, by a processor, reference audio signals from an audio stream for each of a plurality of channels;
   receiving, by the processor, an audio sample collected for a given time slice from a tuned-to channel at a media device, the tuned-to channel corresponding to a specific channel of the plurality of channels, where the audio sample represents audio of a program displayed on the tuned-to channel;
   determining, by the processor, a set of candidate channels of the plurality of channels to compare corresponding reference audio of said candidate channels to the audio sample, comprising:
      determining posterior probabilities for each of the plurality of channels based on prior probabilities for each of the plurality of channels that a channel is the tuned-to channel, and
      eliminating one or more of the plurality of channels from the set of candidate channels for comparison of reference audio of said candidate channels to the audio sample based on a pre-determined minimum posterior probability value;
   comparing, by the processor, for the given time slice, a reference audio of each channel of the set of candidate channels to the sample audio; and
   identifying, by the processor, a channel of the set of candidate channels as the tuned-to channel of the media device based on a specified confidence level.

14. The method of claim 13, further comprising:
   identifying, by the processor, a channel of the set of candidate channels as the tuned to channel of the media device for two or more consecutive time slices; and
   increasing, by the processor, a confidence value that the identified channel is the tuned to channel of the media device based on the identifying for the two or more consecutive time slices.

15. The method of claim 13, wherein the channels are broadcast television programs.

16. The method of claim 13, wherein the program is a time-shifted television program.

* * * * *